(12) United States Patent
Nishiguchi et al.

(10) Patent No.: US 12,403,909 B2
(45) Date of Patent: Sep. 2, 2025

(54) CONTROL DEVICE AND CONTROL METHOD

(71) Applicant: HONDA MOTOR CO., LTD., Tokyo (JP)

(72) Inventors: Haruhiko Nishiguchi, Wako (JP); Daichi Kato, Wako (JP); Shingo Ito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 327 days.

(21) Appl. No.: 18/111,182

(22) Filed: Feb. 17, 2023

(65) Prior Publication Data
US 2023/0303076 A1 Sep. 28, 2023

(30) Foreign Application Priority Data
Mar. 25, 2022 (JP) ................. 2022-050386

(51) Int. Cl.
*B60W 30/18* (2012.01)
*B60W 50/10* (2012.01)
*B60W 50/14* (2020.01)

(52) U.S. Cl.
CPC ...... *B60W 30/18163* (2013.01); *B60W 50/10* (2013.01); *B60W 50/14* (2013.01); *B60W 2556/40* (2020.02)

(58) Field of Classification Search
CPC .......... B60W 30/18163; B60W 50/10; B60W 50/14; B60W 2556/40; B60W 60/005; G01C 21/3863; G01C 21/3407; G01C 21/30; G05D 1/0214; G05D 1/0088
See application file for complete search history.

(56) References Cited

U.S. PATENT DOCUMENTS

| | | | |
|---|---|---|---|
| 9,304,513 | B2 | 4/2016 | Ichikawa et al. |
| 9,891,622 | B2 | 2/2018 | Ichikawa et al. |
| 10,266,109 | B2 | 4/2019 | Fujii |
| 10,928,818 | B2 | 2/2021 | Ichikawa et al. |

(Continued)

FOREIGN PATENT DOCUMENTS

| | | |
|---|---|---|
| JP | 5382218 B2 | 1/2014 |
| JP | 2018-103767 A | 7/2018 |

(Continued)

OTHER PUBLICATIONS

Japanese Office Action for Japanese Patent Application No. 2022050386 mailed Sep. 19, 2023.

*Primary Examiner* — George C Jin
(74) *Attorney, Agent, or Firm* — Thomas Horstemeyer, LLP

(57) ABSTRACT

A control device controlling a vehicle, includes a control unit configured to execute lane change assist control of the vehicle, and an acquisition unit configured to acquire highly accurate map information that contains location information within a lane. When the acquisition unit acquires the highly accurate map information that contains information regarding a road on which the vehicle is running, the control unit is configured to be capable of executing the lane change assist control, and when the acquisition unit does not acquire the highly accurate map information that contains the information regarding a road on which the vehicle is running, the control unit does not execute the lane change assist control.

15 Claims, 10 Drawing Sheets

| | MANUAL DRIVING MODE (MODE 1) | NORMAL SUPPORT MODE (MODE 2) | EXTENSION SUPPORT MODE (MODE 3) |
|---|---|---|---|
| ACC | X | O | O (with map) |
| ACC + LKAS | X | O | O (with map) |
| ALC | X | X | O |
| ALCA | X | X | O |

(56) References Cited

U.S. PATENT DOCUMENTS

| | | |
|---|---|---|
| 11,260,865 B2 | 3/2022 | Ishioka et al. |
| 11,731,665 B2 | 8/2023 | Takamatsu et al. |
| 2013/0110343 A1 | 5/2013 | Ichikawa et al. |
| 2016/0170410 A1 | 6/2016 | Ichikawa et al. |
| 2016/0272202 A1* | 9/2016 | Inomata ................ B60W 30/12 |
| 2018/0113474 A1* | 4/2018 | Koda ................... G05D 1/0274 |
| 2018/0143629 A1 | 5/2018 | Ichikawa et al. |
| 2018/0178714 A1 | 6/2018 | Fujii |
| 2018/0267557 A1* | 9/2018 | Yan ................... B60W 50/0098 |
| 2020/0110422 A1* | 4/2020 | Takamatsu ...... B60W 30/18163 |
| 2020/0269844 A1 | 8/2020 | Ishioka et al. |
| 2021/0240181 A1 | 8/2021 | Ichikawa et al. |
| 2022/0120582 A1* | 4/2022 | Pei .................... G01C 21/3407 |
| 2022/0297694 A1* | 9/2022 | Kikuchi ............... G06V 20/588 |

FOREIGN PATENT DOCUMENTS

| | | |
|---|---|---|
| JP | 2019053388 A | 4/2019 |
| JP | 2020-138578 A | 9/2020 |
| WO | 2018189843 A1 | 10/2018 |

\* cited by examiner

FIG. 2

|  | MANUAL DRIVING MODE (MODE 1) | NORMAL SUPPORT MODE (MODE 2) | EXTENSION SUPPORT MODE (MODE 3) |
|---|---|---|---|
| ACC | × | ○ | ○ (with map) |
| ACC + LKAS | × | ○ | ○ (with map) |
| ALC | × | × | ○ |
| ALCA | × | × | ○ |

CONTROL DEVICE AND CONTROL METHOD

CROSS-REFERENCE TO RELATED APPLICATION(S)

This application claims priority to and the benefit of Japanese Patent Application No. 2022-050386 filed on Mar. 25, 2022, the entire disclosure of which is incorporated herein by reference.

BACKGROUND OF THE INVENTION

Field of the Invention

The present invention relates to a drive-assist technique for vehicles.

Description of the Related Art

Known drive-assist techniques for vehicles include acceleration/deceleration assist control, lane keeping assist control, and lane change assist control (see Japanese Patent No. 5382218 and Japanese Patent Laid-Open Nos. 2018-103767 and 2020-138578). Such controls are executed based on map information and a sensing result of a sensor that senses a situation around a vehicle. The map information used lately includes: relatively lowly accurate map information used for route guidance for vehicles; and highly accurate map information (high-definition map information) that contains location information within lanes.

The above highly accurate map information contains large volumes of information. If using the highly accurate map information, drive assist control can provide passengers with more reliable and smoother drive assist. Thus, the use of the highly accurate map information is effective, especially for the lane change assist control, which requires advanced control technique. On the other hand, under the lane change assist control, vehicles may behave differently depending on whether the highly accurate map information is used, thereby probably making the passengers feel uncomfortable.

SUMMARY OF THE INVENTION

An object of the present invention is to provide a passenger in a vehicle with highly reliable lane change assist by suppressing the passenger from feeling uncomfortable.

According to an aspect of the present invention, there is provided a control device controlling a vehicle, comprising:
  a control unit configured to execute lane change assist control of the vehicle; and
  an acquisition unit configured to acquire highly accurate map information that contains location information within a lane,
  wherein when the acquisition unit acquires the highly accurate map information that contains information regarding a road on which the vehicle is running, the control unit is configured to be capable of executing the lane change assist control, and
  when the acquisition unit does not acquire the highly accurate map information that contains the information regarding a road on which the vehicle is running, the control unit does not execute the lane change assist control.

Further features of the present invention will become apparent from the following description of exemplary embodiments (with reference to the attached drawings).

BRIEF DESCRIPTION OF THE DRAWINGS

FIG. 2 is an explanatory diagram illustrating types of drive assist modes and their outlines;

DESCRIPTION OF THE EMBODIMENTS

Figure 1:
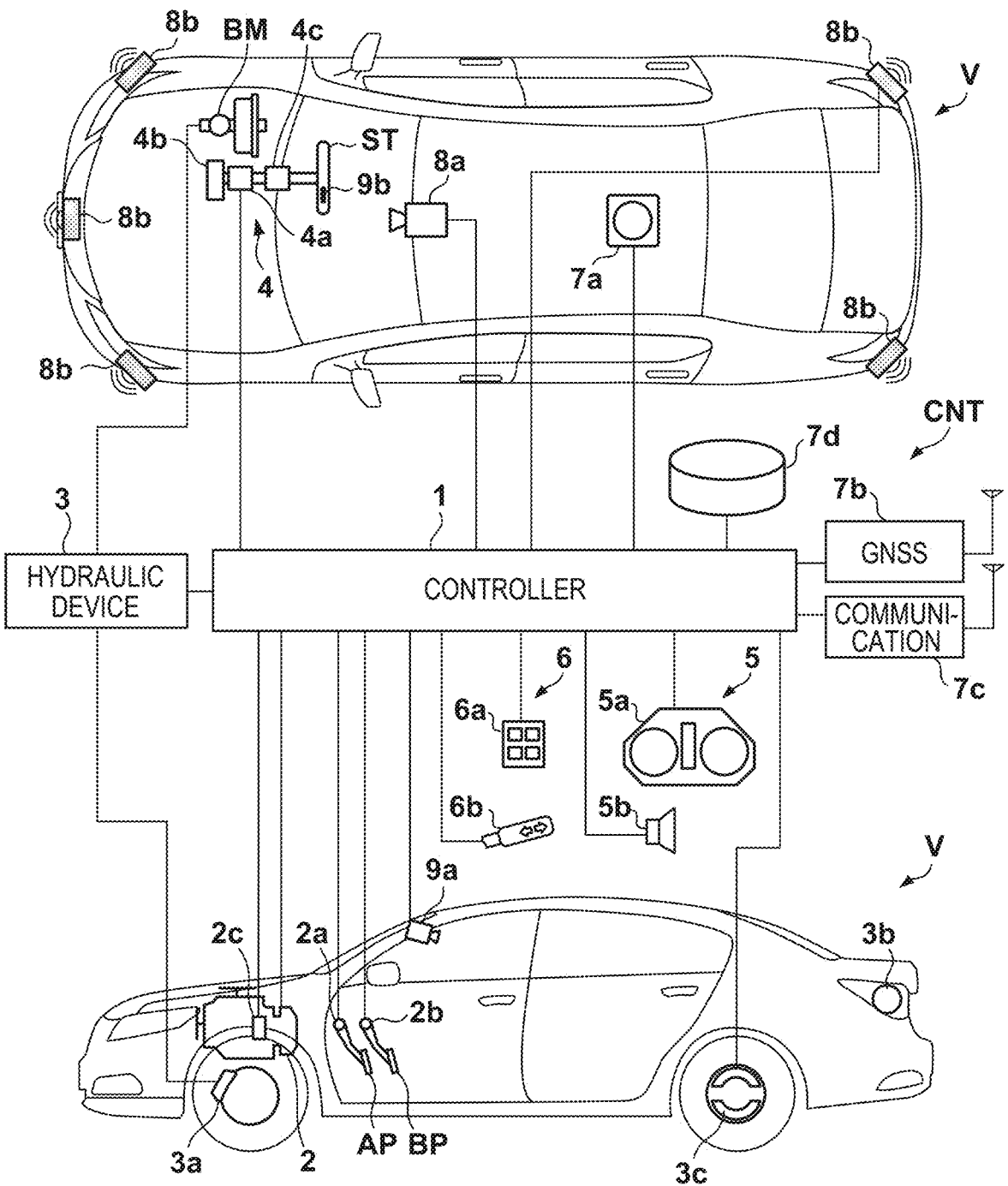
FIG. 1 is a block diagram of a vehicle and a control device.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

Control Device and its Application Example

FIG. 1 is a block diagram of a control device CNT according to an embodiment of the present invention and also a schematic diagram of a vehicle V, which is an application example of the control device CNT. Further, FIG. 1 schematically illustrates the top and a side of the vehicle V. The vehicle V in this embodiment is an example and may be a sedan-type four-wheeled passenger vehicle or a parallel hybrid vehicle, for example. It should be noted that the vehicle V is not limited to such a four-wheeled passenger vehicle; alternatively, the vehicle V may be a straddle type vehicle (motorcycle or three-wheeled vehicle) or a large vehicle, such as a truck or a bus.

A control device CNT includes a controller 1, which is implemented by an electronic circuit that controls the vehicle V, such as assisting in driving the vehicle V. The controller 1 includes a plurality of electronic control units (ECUs). The ECUs are provided for respective functions of the control device CNT, for example. Each ECU includes a processor represented by a central processing unit (CPU), a storage device, such as a semiconductor memory, and an interface with an external device. The storage device stores programs to be executed by the processor, data to be processed by the processor, and other information. The interface includes an input/output interface unit and a communication interface unit. Alternatively, each ECU may include a plurality of processors, a plurality of storage devices, and a plurality of interfaces. A program to be stored in the storage device may be installed in the control device CNT via a storage medium, such as a CD-ROM, and thereby stored in the storage device.

The controller 1 controls driving (acceleration) of the vehicle V by controlling a power unit (power plant) 2. The power unit 2, which serves as a run driver that outputs driving force to rotate drive wheels of the vehicle V, can include an internal combustion engine, a motor, and an automatic transmission. The motor can be used as a driving source that accelerates the vehicle V and also as a generator upon deceleration, for example (regeneration braking).

In this embodiment, the controller 1 controls the outputs of the internal combustion engine and the motor and switches the gear range of the automatic transmission, for example, in response to driver's drive operation sensed by an operation sensor 2a provided in an accelerator pedal AP and by an operation sensor 2b provided in a brake pedal BP and in accordance with a speed of the vehicle V sensed by a rotation speed sensor 2c. In this case, the automatic transmission is provided with the rotation speed sensor 2c as a sensor that senses a running state of the vehicle V; the rotation speed sensor 2c senses a rotation speed of an output shaft of the automatic transmission. The speed of the vehicle V can be calculated from a sensing result of the rotation speed sensor 2c.

The controller 1 controls braking (deceleration) of the vehicle V by controlling a hydraulic device 3. The driver's braking operation on the brake pedal BP is converted into hydraulic pressure in a brake master cylinder BM and is then transmitted to the hydraulic device 3. The hydraulic device 3 is implemented by an actuator that controls, based on the hydraulic pressure transmitted from the brake master cylinder BM, a pressure of hydraulic oil supplied to a brake device (e.g., disc brake device) 3a provided in each of the four wheels.

The controller 1 can control the braking of the vehicle V by controlling driving of an electromagnetic valve or other component provided in the hydraulic device 3. The controller 1 can also form an electric servo brake system by controlling the proportion of the braking force generated by the brake device 3a to the braking force generated by the regeneration braking of the motor provided in the power unit 2. Optionally, the controller 1 may turn on brake lamps 3b upon braking.

The controller 1 controls steering of the vehicle V by controlling an electric power steering device 4. The electric power steering device 4 includes a mechanism for steering the front wheels in response to a driver's drive operation (steering operation) on a steering wheel ST. The electric power steering device 4 includes a drive unit 4a, which generates driving force for use in assisting the steering operation or automatically steering the front wheels of the vehicle V; this driving force is sometimes referred to as the steering assist torque. The drive unit 4a includes a motor as a drive source. In addition, the electric power steering device 4 further includes: a steering angle sensor 4b that senses a steering angle; and a torque sensor 4c that senses a steering torque that places a load on the driver; the steering torque is referred to as the steering load torque and distinguished from the steering assist torque.

The controller 1 controls electric parking brake devices 3c provided in the respective rear wheels of the vehicle V. Each electric parking brake device 3c includes a mechanism for locking a corresponding rear wheel. The controller 1 can control locking/unlocking of the rear wheels by the electric parking brake devices 3c.

The controller 1 controls an information output device 5 that notifies a driver of information in the vehicle V. For example, the information output device 5 includes: a display device 5a that notifies the driver of information by using an image; and/or a voice output device 5b that notifies the driver of information by using a voice. Examples of the display device 5a include: a display device provided in an instrument panel; and a display device provided in the steering wheel ST. In this case, the display device 5a may include a head-up display. Alternatively, the information output device 5 may notify a passenger of information in the vehicle V by using vibration or light.

The controller 1 receives an instruction entry from the passenger (e.g., driver) via an input device 6. The input device 6, which is disposed where it can be operated by the driver, includes: a switch group 6a via which the driver can instruct the vehicle V; and/or a blinker lever 6b via which the driver activates direction indicators (blinkers), for example.

The controller 1 recognizes and determines a current location and route (orientation) of the vehicle V. In this embodiment, the vehicle V includes a gyro sensor 7a, a global navigation satellite system (GNSS) sensor 7b, and a communication device 7c. The gyro sensor 7a senses a rotational motion (yaw rate) of the vehicle V. The GNSS sensor 7b senses the current location of the vehicle V. The communication device 7c wirelessly communicates with a server that can provide map information and traffic information and then acquires such information. In this embodiment, the controller 1 determines along which route the vehicle V is running, based on the sensing results of the gyro sensor 7a and the GNSS sensor 7b. Meanwhile, the controller 1 continuously acquires the map information regarding the determined route from the server via the communication device 7c and then stores the acquired map information in the database (storage device) 7d. In this case, the vehicle V may also include another sensor that senses a state of the vehicle V, such as an acceleration sensor that senses acceleration of the vehicle V.

The controller 1 assists the driving of the vehicle V, based on sensing results of various sensing units provided in the vehicle V. The vehicle V includes: a plurality of surrounding situation sensing units 8a and 8b, each of which serves as an external sensor that senses a situation outside (or surrounding) the vehicle V; and a plurality of in-vehicle sensing units 9a and 9b, each of which serves as an in-vehicle sensors that senses a state inside the vehicle (the state of passengers, particularly the driver). The controller 1 can grasp the situation surrounding the vehicle V, based on the sensing results of the surrounding situation sensing units 8a and 8b and then assist in driving the vehicle V in accordance with this surrounding situation. In addition, the controller 1 can also determine, based on the sensing results of the in-vehicle sensing units 9a and 9b, whether the driver is fulfilling predetermined operational obligations imposed on him/her when the controller 1 assists the driving.

The surrounding situation sensing unit 8a, which is implemented by an imaging device that captures an image of a forward area of the vehicle V, is attached to the inner side of the windshield disposed in front of the roof of the vehicle V, for example; the surrounding situation sensing unit 8a is sometimes referred to as the front camera 8a. The controller 1 can analyze the image captured by the front camera 8a, thereby extracting, from this image, the contour of a target object or a mark line, such as a white line, of a lane on a road.

Each surrounding situation sensing unit 8b, which is implemented by a millimeter wave radar, senses a target object present around the vehicle V by using electromagnetic waves, senses (measures) a distance to the target object and a direction to the target object relative to the vehicle V (azimuth therebetween); the surrounding situation sensing unit 8b is sometimes referred to as the radar 8b. In the example illustrated in FIG. 1, five radars 8b are provided: one is provided at the center of a front portion of the vehicle V; two are provided at the right and left corners of this front portion; and the remaining ones are provided at the right and left corners of a rear portion of the vehicle V.

It should be noted that the configuration of the surrounding situation sensing units provided in the vehicle V is not limited to the above. Alternatively, any numbers of cameras and radars or a light detection and ranging (LIDAR) that senses a target object present around the vehicle V may be provided as the surrounding situation sensing units.

The in-vehicle sensing unit 9a, which is implemented by an imaging device that captures an image of the inner space of the vehicle V, is attached to the inner side of the vehicle V in front of the roof, for example; the in-vehicle sensing unit 9a is sometimes referred to as the in-vehicle camera 9a. In this embodiment, the in-vehicle camera 9a may be a driver monitor camera that captures an image of the driver (e.g., driver's eyes and face). The controller 1 can analyze the image (the image of the driver's face) captured by the in-vehicle camera 9a, thereby determining in which directions driver's face and line of sight are facing.

The in-vehicle sensing unit 9b, which is implemented by a grip sensor for sensing that the driver is gripping the steering wheel ST, is provided in at least a portion of the steering wheel ST, for example; the in-vehicle sensing unit 9b is sometimes referred to as the grip sensor 9b. It should be noted that such an in-vehicle sensing unit may be implemented by the torque sensor 4c that senses the steering torque of the driver.

Example of Drive Assist Control

Examples of the drive assist for the vehicle V provided to the driver include acceleration/deceleration assist, lane keeping assist, and lane change assist. The acceleration/deceleration assist corresponds to drive assist (adaptive cruise control (ACC)) under which the controller 1 automatically controls acceleration/deceleration of the vehicle V within a predetermined speed range by automatically controlling both the power unit 2 and the hydraulic device 3 based on the map information and the sensing results of the surrounding situation sensing units 8a and 8b. When another vehicle (preceding vehicle) is running in front of the vehicle V, ACC can also be executed to accelerate/decelerate the vehicle V so that the distance between the vehicle V and the preceding vehicle is kept constant. ACC is effective in lightening a burden on the driver which may be involved in his/her acceleration/deceleration operation (operation on the accelerator pedal AP or the brake pedal BP).

The lane keeping assist corresponds to drive assist (lane keeping assist system (LKAS)) in which the controller 1 automatically controls the electric power steering device 4 based on the map information and the sensing results of the surrounding situation sensing units 8a and 8b so that the vehicle V keeps running within the lane. LKAS is effective in lightening a burden on the driver which may be involved in a steering operation (operation on the steering wheel ST) during the straight-ahead running of the vehicle V.

The lane change assist corresponds to drive assist (auto lane changing (ALC) or active lane change assist (ALCA)) in which the controller 1 changes the lane on which the vehicle V is running to the adjacent one by automatically controlling the power unit 2, the hydraulic device 3, and the electric power steering device 4 based on the map information and the sensing results of the surrounding situation sensing units 8a and 8b. ALC corresponds to the lane change assist based on a system request, whereas ALCA corresponds to the lane change assist based on a passenger's request. Examples of a situation where the system request arises include: a situation where a navigation system recommends the driver to change lanes during route guidance of the vehicle V to a destination; and another situation where the vehicle V attempts to overtake a preceding vehicle independently of the route guidance. To make the passenger's request to change lanes, the driver needs to operate an input device (e.g., blinker lever 6b). Both ALC and ALCA are effective in lightening a burden on the driver which may be involved in acceleration/deceleration operation or the steering operation on the vehicle V during the lane change.

Some other examples of the drive assist control may include: collision cushioning braking, an ABS function, and traction control that assist in avoiding collision with a target object on a road (e.g., a pedestrian, another vehicle, or an obstacle) by controlling the hydraulic device 3; and control of the orientation of the vehicle V.

Drive Assist Mode

This embodiment provides a plurality of drive assist modes of providing different drive assists; among the modes, one is selectively set. FIG. 2 is an explanatory diagram of those drive assist modes. This table indicates whether the three modes, or ACC, LKAS, ALC, and ALCA, are executed in each of modes 1 to 3. It should be noted that the drive assist in modes 1 to 3 is not limited to ACC, LKAS, ALC, and ALCA, and some other drive assists may be possible. Furthermore, only one of ALC and ALCA may be possible.

Mode 1 corresponds to a manual drive mode in which none of ACC, LKAS, ALC, and ALCA is executed and is thus based on driver's manual drive operation. This mode is set first when the vehicle V starts up.

Both mode 2 and mode 3 are set under the condition that the passenger requests the drive assist when the vehicle V is in mode 1. Mode 2 is a regular assist mode in which both ACC and LKAS are executable. In Mode 2, neither ALC nor ALCA is executed.

Mode 3 is an extended assist mode in which all of ACC, LKAS, ALC, and ALCA are executable. Mode 3 is set under the condition that the controller 1 has acquired highly accurate map information (high-definition map information) that contains a road (roadway) on which the vehicle V is running. The highly accurate map information contains more precise road information than map information (sometimes referred to as regular map information) used for route guidance to a destination. More specifically, the highly accurate map information contains at least location information within lanes. With the highly accurate map information, the controller 1 can control a location of the vehicle V in a vehicle width direction. In this case, the highly accurate information may further contain detailed information regarding geography of roads, such as presence/absence of curves, their curvatures, increasing/decreasing numbers of lanes, and gradients. The highly accurate map information is available for each region or each zone on roads, for example. For some regions and road zones, however, the highly accurate map information may be unavailable.

In mode 3, the controller 1 uses the above highly accurate map information to perform the lane change assist (ALC or ALCA). The controller 1 can utilize the location information within the lane contained in the highly accurate map information and the current location of the vehicle V detected by the GNSS sensor 7b and provide highly reliable and smooth lane change assist while recognizing other vehicles surrounding the vehicle V from the sensing results of the sensing units 8a and 8b. Actually, the controller 1 could provide the lane change assist without using the highly accurate map information. In which case, the vehicle V might behave differently during the lane change assist, depending on whether the highly accurate map information is used, thereby making the passenger feel uncomfortable. In this embodiment, however, the controller 1 provides the lane change assist under the condition that the highly accurate map information has been acquired. It is therefore possible to suppress the passenger from feeling uncomfortable, thereby providing highly reliable lane change assist to the passenger.

In each of mode 2 and mode 3, both ACC and LKAS are executable. More specifically, in mode 3, ACC and LKAS using the highly accurate map information are executable. Because of using the highly accurate map information, ACC and LKAS in mode 3 are represented, respectively, as ACC with map and LKAS with map. The controller 1 can accelerate or decelerate the vehicle V and control the location of the vehicle V in a horizontal direction by acquiring, in advance, information regarding a road on which the vehicle will run from the highly accurate map information. It is therefore possible to provide further highly reliable and smooth ACC and LKAS to the passenger.

In this embodiment, the driver needs to fulfill predetermined operational obligations, such as peripheral monitoring and gripping of the steering wheel, in both mode 2 and mode 3. When determining that the driver fails to fulfill these operational obligations, based on the sensing results of the in-vehicle sensing units 9a and 9b, the controller 1 causes the information output device 5 to output a notification (alarm) for encouraging the driver to fulfill the operational obligations.

Example of Transition Between Mode Settings

Figure 3:
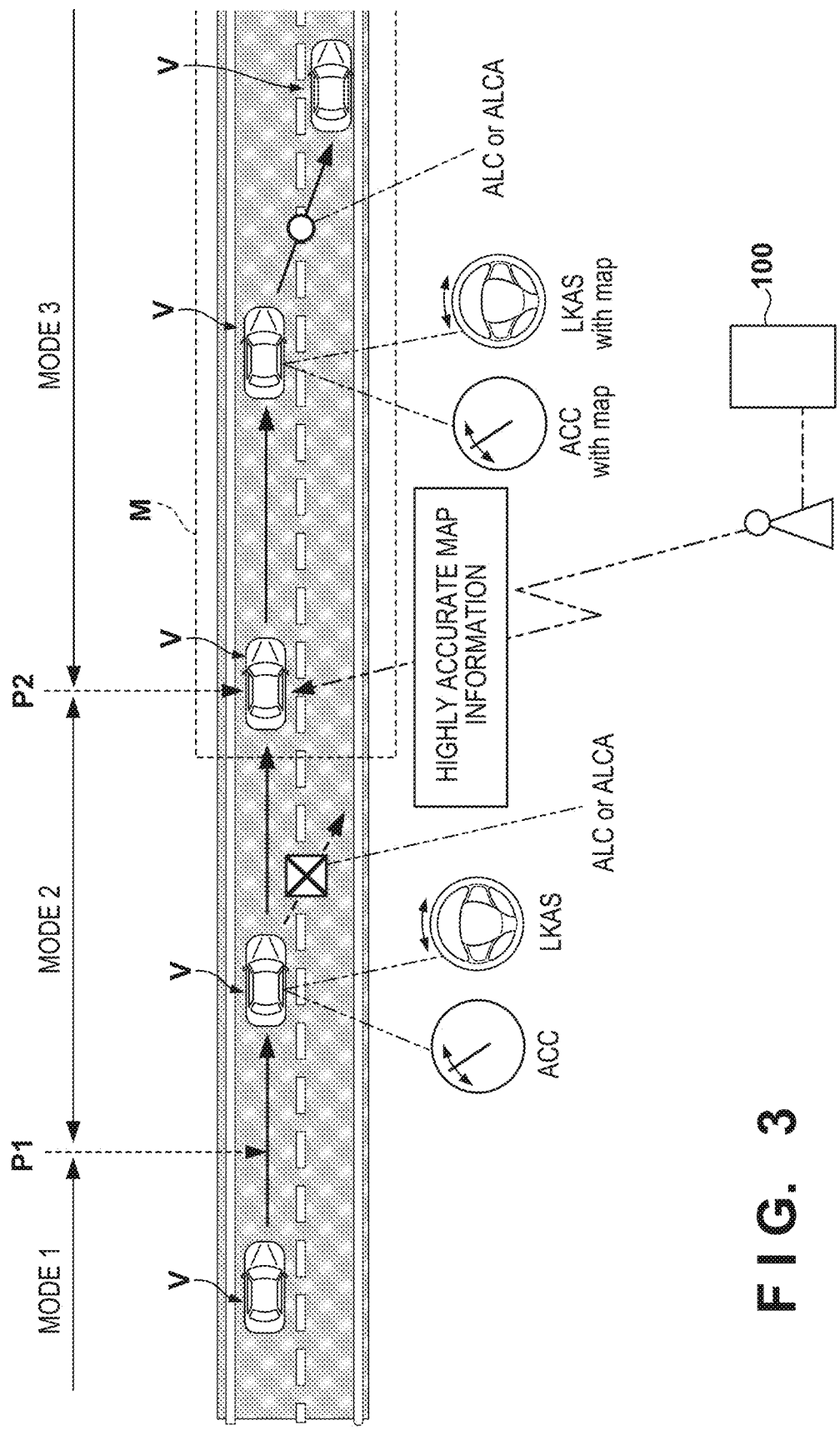
FIG. 3 is an explanatory diagram illustrating an example of switching between the drive assist modes.

FIG. 3 is a diagram illustrating an example of a transition between the drive assist modes. While the vehicle V that has been set to mode 1 is running on a road, the driver requests drive assist through the input device 6 at a location P1. In response to this request, the controller 1 sets the vehicle V to mode 2. The controller 1 then executes both ACC and LKAS on the vehicle V In this case, the controller 1 executes neither ALC nor ALCA on the vehicle V, as indicated by the "cross mark" in FIG. 3. If the driver wishes to change the lanes, he/she needs to manually perform the drive operation.

The road (roadway) on which the vehicle V is running has a zone M, regarding which the highly accurate map information is available. At a location P2, the controller 1 causes the communication device 7c to acquire (receive) the highly accurate map information regarding the zone M from the map-providing server 100 via the communication line. In response, the drive assist mode is switched from mode 2 to mode 3. The controller 1 executes ACC or LKAS with the highly accurate map information. In this case, the controller 1 can execute ALC in response to the system request or can execute ALCA in response to the passenger's request, as indicated by the "circle mark" in FIG. 3.

Process Example

A description will be given below of an example of a process performed by processors provided in the ECUs, which constitute the controller 1.

Monitoring of Operational Obligations

Figure 4C:
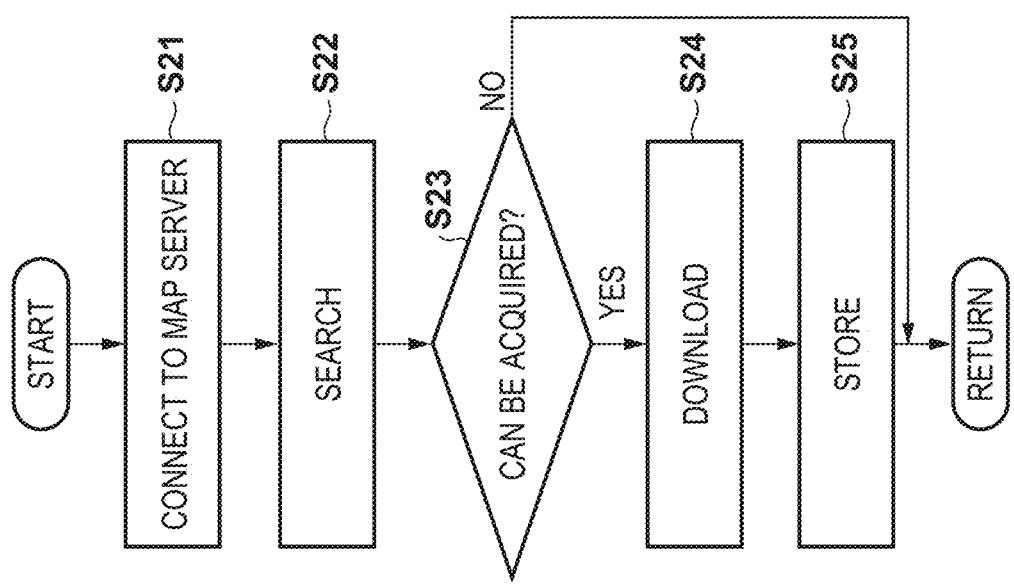
FIGS. 4A to 4C are each a flowchart of an example of a process performed by a control device illustrated in FIG. 1.
Figure 4B:
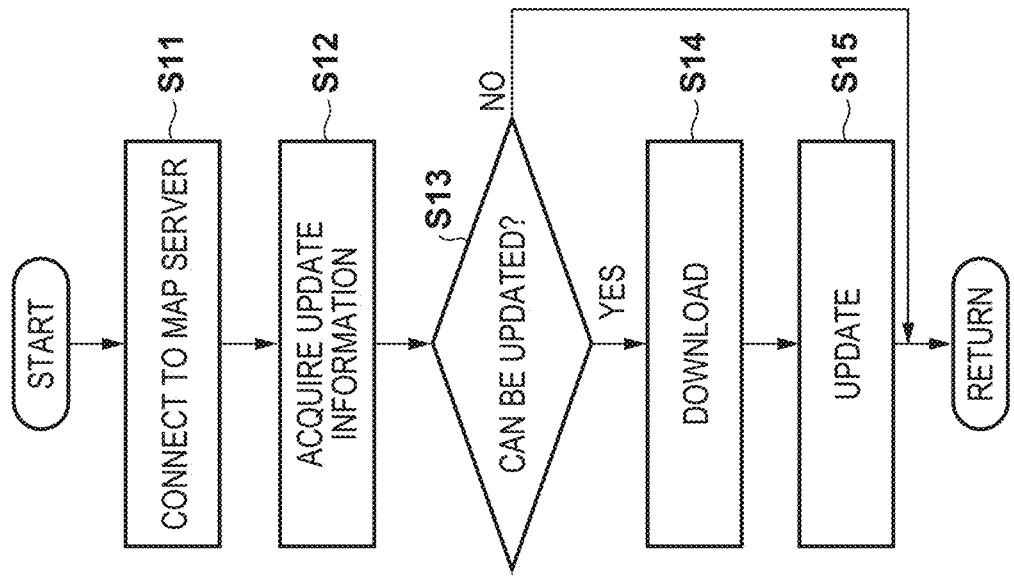
Figure 4A:
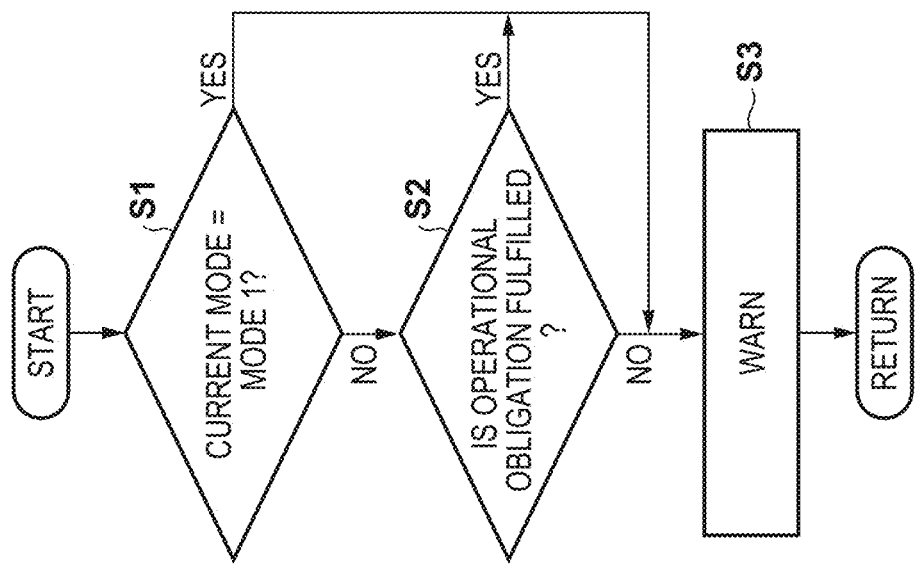

FIG. 4A is a flowchart of an example of a process performed by an ECU to monitor a driver's operational obligations; this process is performed in a periodic manner.

In S1, the ECU determines whether a current drive assist mode is mode 1. When the current drive assist mode is mode 1, the ECU terminates this process; when it is mode 2 or mode 3, the ECU makes the process proceed to S2. In S2, the ECU determines whether the driver is fulfilling the operational obligations, based on the sensing results of the sensing units 9a and 9b. When determining that the driver is fulfilling the operational obligations, the ECU terminates this process. When determining that the driver is not fulfilling them, the ECU makes the process proceed to S3. In S3, the ECU causes the information output device 5 to warn the driver.

Management of Highly Accurate Map Information

FIGS. 4B and 4C are each a flowchart of an example of a process performed by the ECU to manage the highly accurate map information. Further, FIG. 4B illustrates an example of a process regarding update (data update) of acquired highly accurate map information; this process is performed, for example, upon startup of the vehicle V.

In S11, the ECU connects to the map-providing server 100 via the communication device 7c and then starts communicating with the map-providing server 100. In step S12, the ECU acquires (receives) update information (information on latest version) regarding acquired highly accurate map information from the map-providing server 100. In S13, the ECU determines whether the acquired highly accurate map information is updatable to the latest version. More specifically, the ECU determines whether the latest version of the highly accurate map information that has already been acquired is available and whether the passenger is entitled to acquire the latest version (e.g., whether he/she has a license and has already paid the fee). When the update is possible, the ECU makes the process proceed to S14, in which the ECU downloads the updated map data on the latest version of the highly accurate map information from the map-providing server 100. In S15, the ECU updates the acquired highly accurate map information by using the updated map data that has been acquired in S14. In this way, the high-definition map information can be maintained in the latest state.

FIG. 4C is a flowchart of a process performed during running of the vehicle V; this process is performed when the vehicle V is running on a road regarding which the highly accurate map information has not been acquired or when the vehicle V enters a road regarding which the highly accurate map information has not been acquired.

In S21, the ECU connects to the map-providing server 100 via the communication device 7c and then starts communicating with the map-providing server 100. In S22, the ECU asks the map-providing server 100 to search for the highly accurate map information containing information regarding a roadway on which the vehicle V is running or regarding a road on which the vehicle V will run and then acquires the answer. In S23, the ECU determines whether it is possible to acquire the highly accurate map information containing information regarding the roadway on which the vehicle V is running or regarding the road on which the vehicle V will run. More specifically, the ECU determines whether the highly accurate map information found by the map-providing server 100 is available and whether the passenger is entitled to acquire this highly accurate map information (e.g., whether he/she has a license and has already paid the fee). If the acquisition is possible, the ECU makes the process proceed to S24, in which the ECU downloads the found highly accurate map information from the map-providing server 100. In S25, the ECU stores, in a database 7*d*, the highly accurate map information that has been acquired in S24. In this way, mode 3 is made settable.

Instead of through the communication with the map-providing server 100, the ECU may acquire the highly accurate map information through installation work performed by a service person in a dealer of the vehicle V.

Mode Setting

Figure 5:
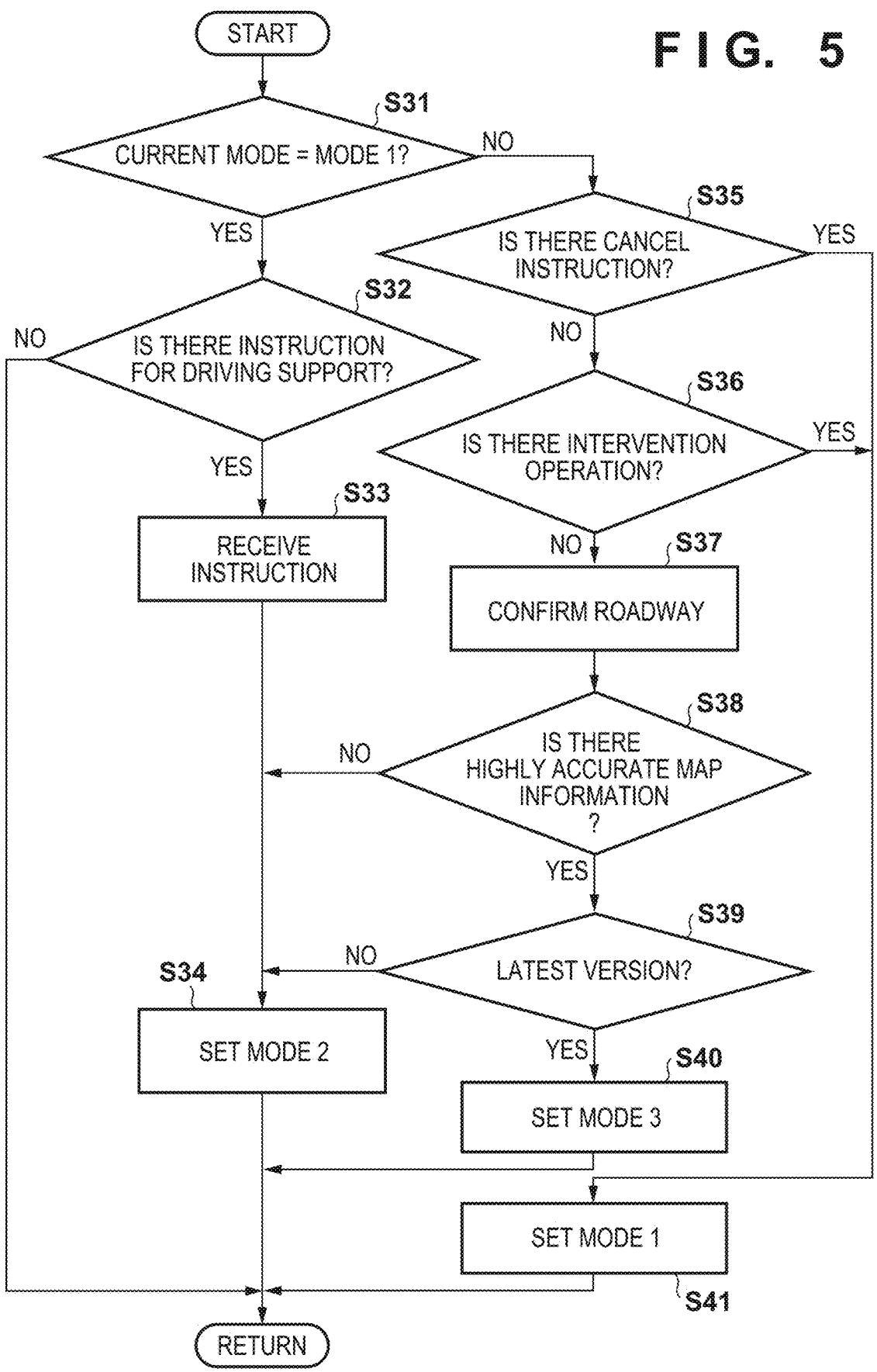
FIG. 5 is a flowchart of an example of a process performed by the control device illustrated in FIG. 1.

FIG. 5 is a flowchart of an example of a process performed by the ECU to set the drive assist mode; this process is performed in a periodic manner. In S31, the ECU determines whether the current drive assist mode is mode 1. When the current drive assist mode is mode 1, the ECU makes the process proceed to S32; when it is mode 2 or mode 3, the ECU makes the process proceed to S35.

In S32, the ECU determines whether it has received a driver's request to start the drive assist. In this case, the ECU can receive this start request from the driver via the input device 6. When receiving the driver's request operation on the input device 6, the ECU accepts the request to start the drive assist in S33 and then sets the vehicle V to mode 2 in S34. In S35, the ECU determines whether it has received a request to cancel the drive assist. The ECU can receive the cancellation request from the driver via the input device 6. When receiving the cancel request, the ECU sets the vehicle V to mode 1 in S41; when not receiving the cancel request, the ECU makes the process proceed to S36.

In S36, the ECU determines whether it has received an intervention operation from the driver. The intervention operation, which refers to a driver's acceleration/deceleration operation and a steering operation during the drive assist, is sensed by the operation sensors 2*a* and 2*b*, the steering angle sensor 4*b*, and the torque sensor 4*c*. When such operations are continued over a predetermined period or in a prescribed amount, the ECU determines that the driver intends to manually drive the vehicle V. Thus, the ECU sets the vehicle V to mode 1 in S41 and then entrusts the driving of the vehicle V to the driver. When receiving no intervention operation, the ECU makes the process proceed to S37.

In S37, the ECU identifies on which roadway the vehicle V is running, based on the sensing result of the GNSS sensor 7*b* and either the regular map information or the highly accurate map information. In step S38, the ECU determines whether it has acquired the highly accurate map information containing information regarding the roadway that has been identified in step S37. When having not acquired this highly accurate map information, the ECU makes the process proceed to S34 and sets the vehicle V to mode 2. When having acquired the highly accurate map information, the ECU makes the process proceed to S39 and determines whether the version of the highly accurate map information is the latest one. In this case, the determination of whether the version of the highly accurate map information is the latest one is based on the update information that has been acquired in S12 illustrated in FIG. 4B. When the version of the highly accurate map information is not the latest one, the ECU may fail to provide sufficiently high-quality drive assist in mode 3. Therefore, the ECU sets the vehicle V to mode 2 in S34. When it is the latest one, the ECU sets the vehicle V to mode 3 in S40.

In this embodiment, once accepting the drive assist request from the passenger in S33, the ECU continues to automatically switch between mode 2 and mode 3 unless the vehicle V is set to mode 1. In which case, no additional drive assist request is necessary. In short, the drive assist request can be a condition for switching from mode 1 to mode 2, rather than a condition for switching from mode 2 to mode 3.

Therefore, after the vehicle V has been set to mode 3, if the highly accurate map information regarding a road on which the vehicle V is running is unavailable, for example, the ECU may switch from mode 3 to mode 2 (S38 or S34). However, when the ECU acquires the highly accurate map information after the vehicle V has run in mode 2, the ECU can switch from mode 2 to mode 3 without the need for an additional drive assist request from the passenger (S38 or S40). As a result, the ECU can provide ALC or ALCA to the driver. Therefore, with unnecessary for an additional driver's drive assist request, the ECU can eliminate the driver' need to perform a specific request operation.

Even after having set the vehicle to either mode 2 or mode 3, the ECU switches from this mode to mode 1 in response to the reception of an intervention operation (S36 or S41). In this case, the ECU requires a drive assist request again in order to return the vehicle V to mode 2 or mode 3. As a result, the ECU can reliably confirm a driver's intention related to the provision of the drive assist.

Customization of Passenger's Setting

Figure 6B:
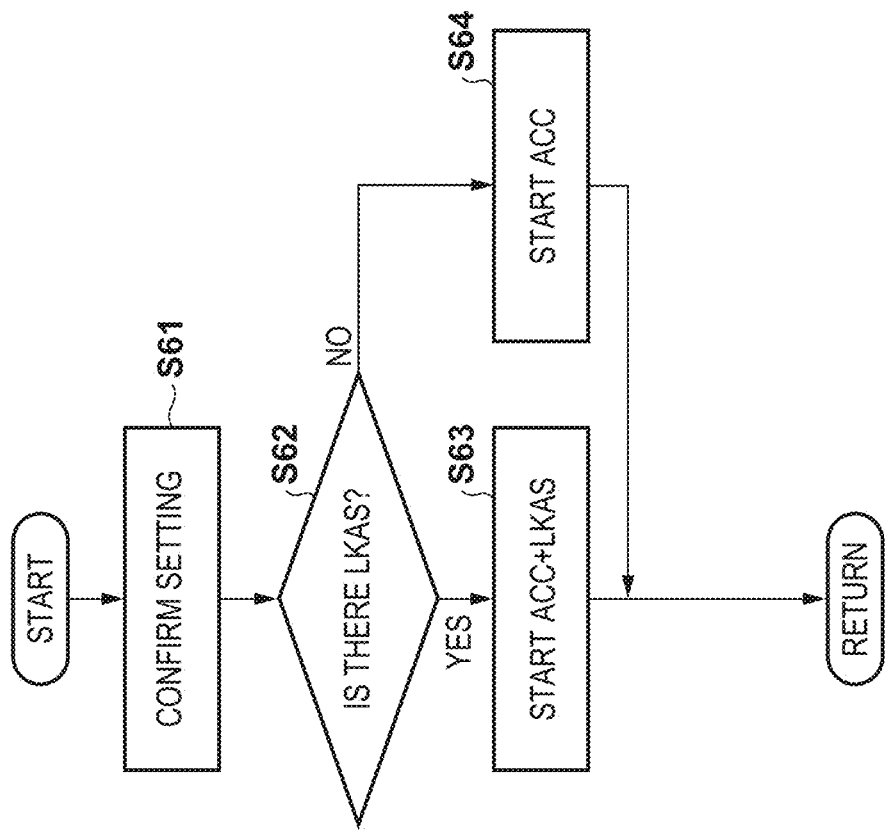
FIGS. 6A and 6B are each a flowchart of an example of a process performed by the control device illustrated in FIG. 1.
Figure 6A:
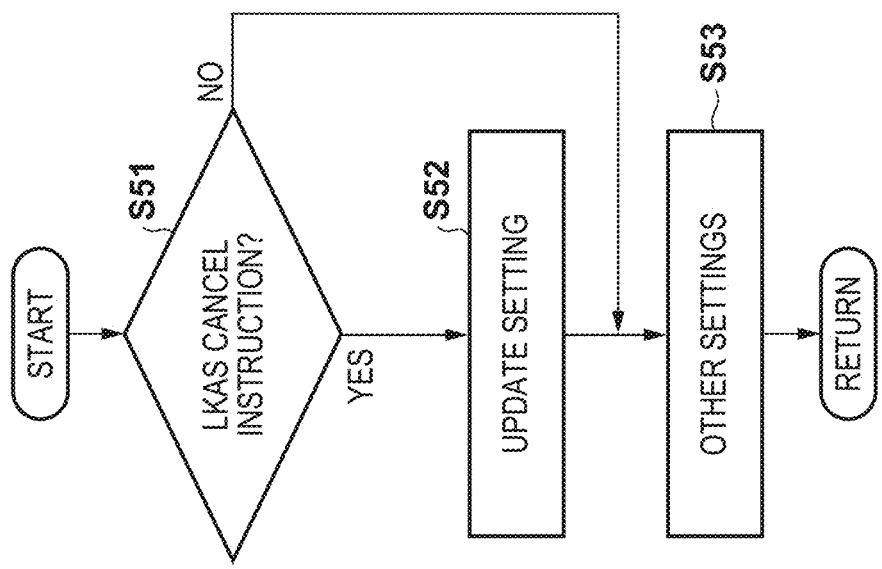

FIG. 6A is a flowchart of an example of a process performed by the ECU to accept a setting change from a passenger; this process is an example of a process to be invoked through a passenger's operation. In this embodiment, each of mode 2 and mode 3 involves executing ACC or LKAS as a primary specification. In some cases, however, the driver wishes the execution of only ACC. The driver is thus permitted to cancel LKAS. In S51, the ECU determines whether it has received a request to cancel LKAS. This cancel request can be entered by the passenger via the input device 6. When having received the cancel request, the ECU accepts it and then updates the setting so as to stop the execution of LKAS in both mode 2 and mode 3. In S53, the ECU performs a process related to some other settings which the passenger wishes to change.

Drive Assist Control at Mode Setting Time

FIG. 6B is a flowchart of an example of a process performed by the ECU to execute the drive assist control; this process is an example of a process performed upon setting of mode 2. In S61, the ECU confirms the setting of LKAS. More specifically, the ECU reads setting information indicating whether the passenger has canceled LKAS through the customization illustrated in FIG. 6A. In S62, the ECU determines whether LKAS is being executed based on the setting information that has been confirmed in S61. When the time of LKAS is set, the ECU makes the process proceed to S63; when LKAS has been canceled, the ECU makes the process proceed to S64.

In S63, the ECU starts executing both ACC and LKAS. Under ACC, the ECU control acceleration/deceleration of the vehicle V so that the speed of the vehicle V is kept within a speed range that has been set by the passenger. Under LKAS, the ECU controls the steering of the vehicle V so that the vehicle V is kept at a predetermined location (e.g., the center) on the roadway in a width direction thereof. In S64, the ECU starts executing ACC but does not start executing LKAS during the setting of mode 2.

Figure 7A:
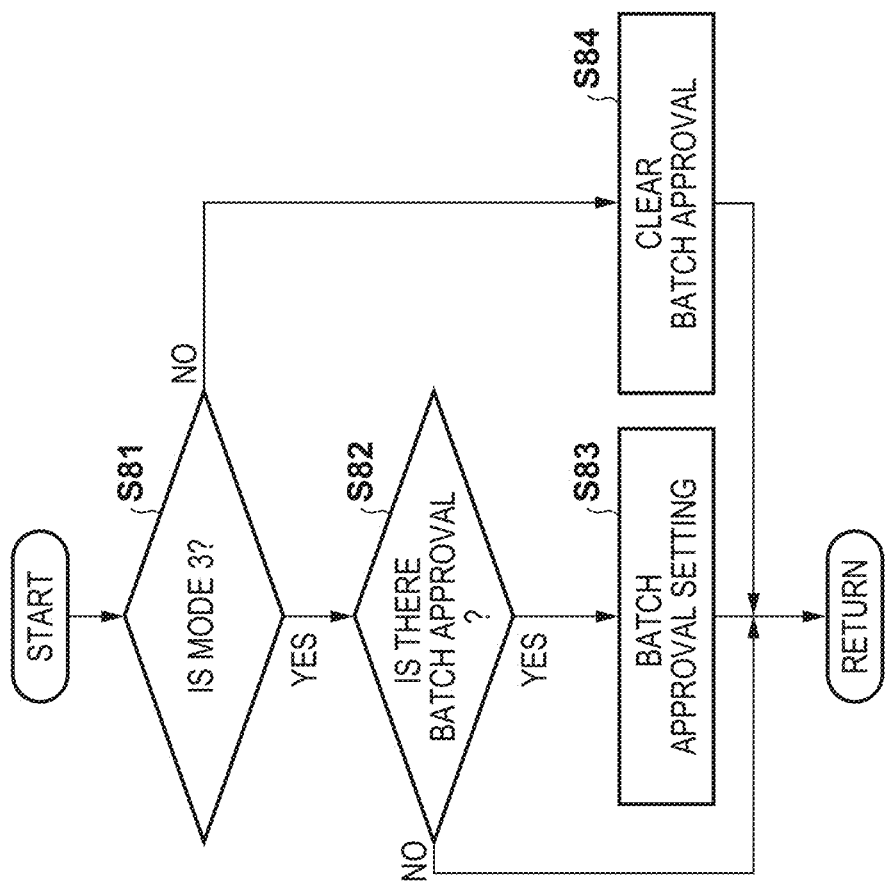
FIGS. 7A and 7B are each a flowchart of an example of a process performed by the control device illustrated in FIG. 1.

FIG. 7A illustrates an example of a process executed during the setting of mode 3. In S71, the ECU confirms the drive assist control in mode 2 before the setting of mode 3. More specifically, the ECU determines whether both ACC and LKAS are being executed. When both ACC and LKAS are being executed, the ECU makes the process proceed to S72; when only ACC is being executed due to the customization of the passenger, the ECU makes the process proceed to S73.

In S72, the ECU starts executing both ACC and LKAS with the highly accurate map information. In S73, the ECU starts executing ACC with the highly accurate map information but does not start executing LKAS during the setting of mode 3.

Batch Approval of Lane Change Assist

Figure 7B:
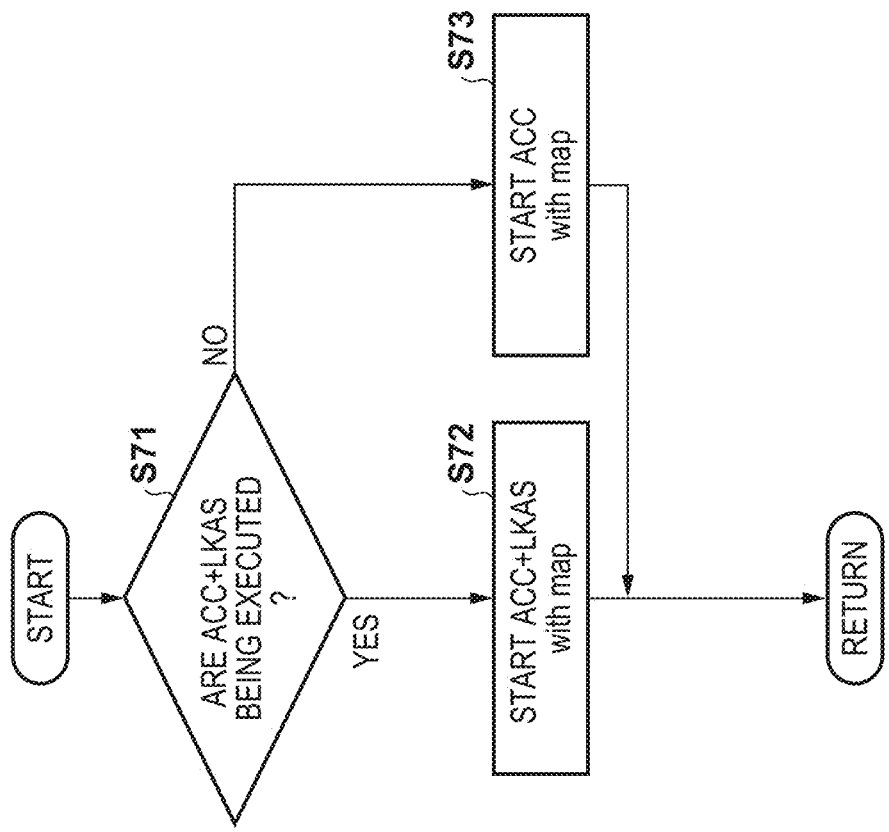

Under ALC, the ECU executes the lane change assist control in accordance with one or more system requests. While the vehicle V that has been set to mode 3 is running, system requests may arise multiple times. If the ECU needs to acquire passenger's approvals to execute the lane change assist whenever system requests arise, the passenger may find it inconvenient. In this embodiment, however, the ECU allows the passenger to give batch approval of ALC for one setting of mode 3. FIG. 7B is a flowchart of an example of a process performed by the ECU to manage passenger's approvals.

In S81, the ECU determines whether the current drive assist mode is mode 3. When the current drive assist mode is mode 3, the ECU makes the process proceed to S82; when it is mode 1 or mode 2, the ECU makes the process proceed to S84.

In S82, the ECU determines whether it has acquired batch approval of ALC from the passenger. In this case, the ECU can receive the passenger's batch approval via the input device 6. When receiving the batch approval via the input device 6, the ECU accepts and sets this batch approval in S83. This approval is valid during the setting of mode 3. In S84, the ECU clears the batch approval. The batch approval becomes invalid whenever the vehicle V is set to either mode 1 or mode 2. When the drive assist mode transits to mode 3 (batch approval), mode 2 (clear of batch approval), and mode 3 in this order, for example, the ECU requires the batch approval again to execute ALC in the last mode 3.

System Request for Lane Change

Figure 8:
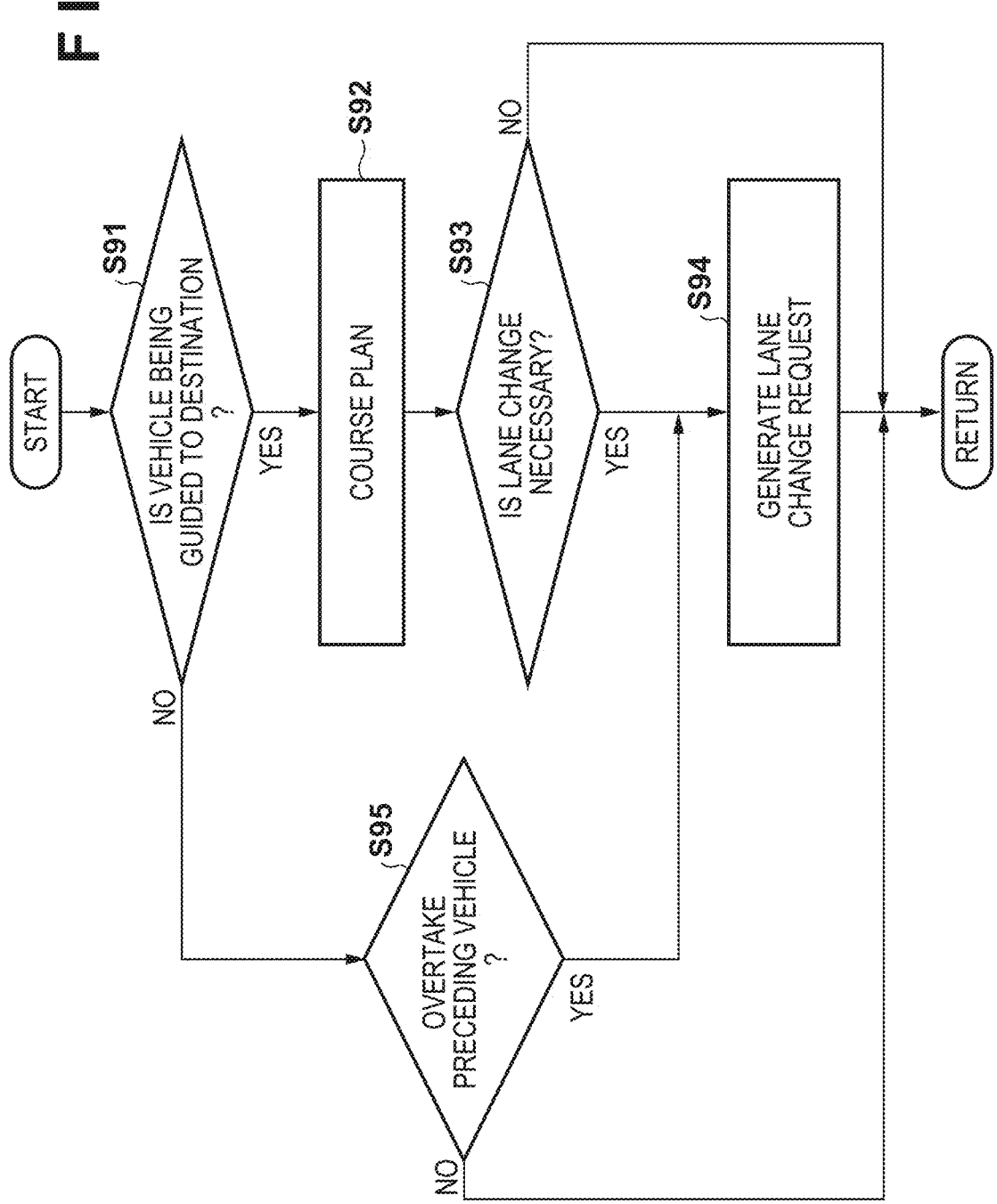
FIG. 8 is a flowchart of an example of a process performed by the control device illustrated in FIG. 1.

FIG. 8 is a flowchart of an example of a process performed by the ECU to perform a process related to a travel plan, such as route guidance to a destination, of the vehicle V; this process is performed in a periodic manner. In S91, the ECU determines whether the vehicle is being guided to the destination set by the passenger. When the vehicle V is being guided, the ECU makes the process proceed to S92; when it is not being guided, the ECU makes the process proceed to S95.

In S92, the ECU performs a process related to a travel plan for the vehicle V to move from the current location to the destination. In this case, the ECU creates a plan about a lane along which the vehicle V will run and a behavior of the vehicle V at a branch point, for example, based on the regular map information. In addition, if a preceding vehicle is present, the ECU also creates a plan about whether to overtake this preceding vehicle, for example, from a relationship with a desired arrival time to the destination.

In S93, the ECU determines whether the vehicle V needs to change lanes, based on the travel plan that has been created in S92. When the vehicle V needs to change lanes, the ECU makes the process proceed to S94, in which the ECU generates a lane change request.

In S95, when a preceding vehicle running slowly is present, the ECU determines whether the vehicle V needs to overtake this preceding vehicle in order to keep running at a speed that has been set, for example, under ACC. When determining that the vehicle needs to overtake the preceding vehicle, the ECU makes the process proceed to S94, in which the ECU generates a lane change request.

Drive Assist Control: Lane Change Assist Control

Figure 9:
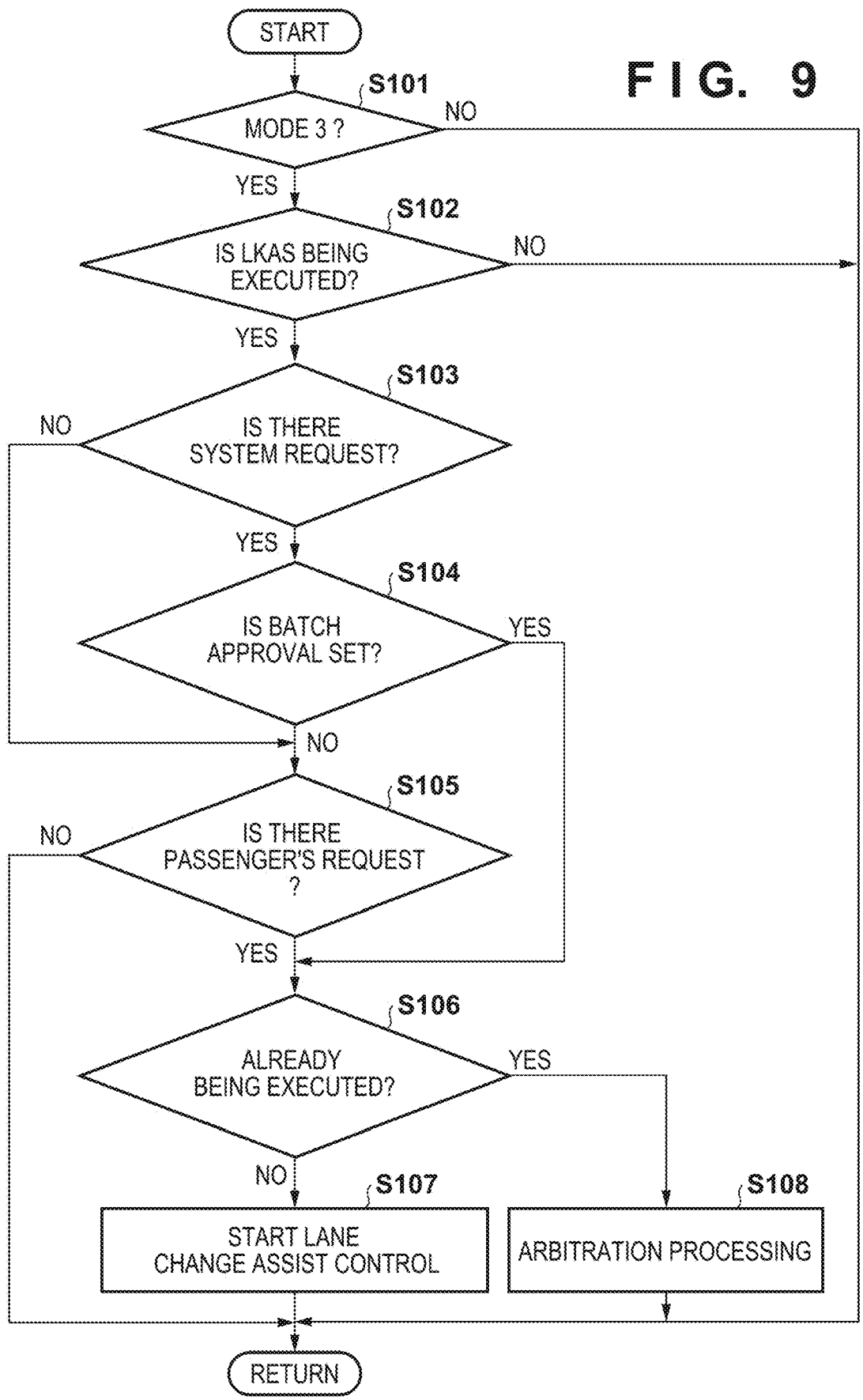
FIG. 9 is a flowchart of an example of a process performed by the control device illustrated in FIG. 1.

FIG. 9 is a flowchart of an example of a process performed by the ECU to execute the drive assist control; this process is an example of a process performed in a periodic manner in relation to ALC or ALCA. In S101, the ECU determines whether the current drive assist mode is mode 3. When the current drive assist mode is mode 3, the ECU makes the process proceed to S102. In S102, the ECU determines whether LKAS (with map) is being executed. When LKAS (with map) is being executed, the ECU makes the process proceed to S103; when it is not being executed, the ECU terminates this process because the location of the vehicle V in the vehicle width direction has not been identified with sufficiently high precision. In short, when LKAS (with map) control is not executed, neither ALC nor ALCA is performed.

In S103, the ECU determines whether a system request for lane change has arisen. When the system request has been generated through the process of S94 illustrated in FIG. 8, the ECU determines that the system request has arisen and then makes the process proceed to S104. When no system request arises, the ECU makes the process proceed to S105.

In S104, the ECU determines whether batch approval of ALC has been set. When the batch approval has been set, the ECU makes the process proceed to S106; when it has not been set, ALC is not executed and the ECU makes the process proceed to S105.

In S105, the ECU determines whether it has received a passenger's request for lane change. When sensing a lane change request operation on the input device (e.g., blinker lever 6b), the ECU makes the process proceed to S106. When sensing no lane change request operation, the ECU terminates this process. In S106, the ECU performs a process related to lane change requests that have arisen at substantially the same time. In this case, the ECU determines whether the lane change assist control is being executed. When the lane change assist control is being executed, the ECU makes the process proceed to S108; when it is not being executed, the ECU makes the process proceed to S107.

In S107, the ECU starts executing the lane change assist control to move the vehicle V to an adjacent lane. In S108, the ECU performs a process of conducting arbitration of both the lane change assist controls that is already being executed and that will be executed. In comparison with the system request, the ECU prioritizes the passenger's request.

When the vehicle V is moving to the left lane in accordance with the system request, for example, if the ECU receives a passenger's request to move to the right lane, the ECU prioritizes the passenger's request and thus starts performing a lane change assist operation to move the vehicle V to the right lane. However, if the vehicle V has already straddled the mark line between the current lane and the left lane, the ECU may once move the vehicle V to the left lane and then accept the passenger's request or reject it.

When the vehicle V is moving to the left lane in accordance with the system request, for example, if the ECU receives a passenger's request to move the left lane, the ECU continues to execute this lane change assist control because the vehicle will move to the same lane in any case.

When the vehicle V is moving to the left lane in accordance with the passenger's request, for example, if the ECU receives a system request to move to the right lane, the ECU prioritizes the passenger's request and thus continues to move the vehicle V to the left lane.

Notification of State of Drive Assist Control

Figure 10:
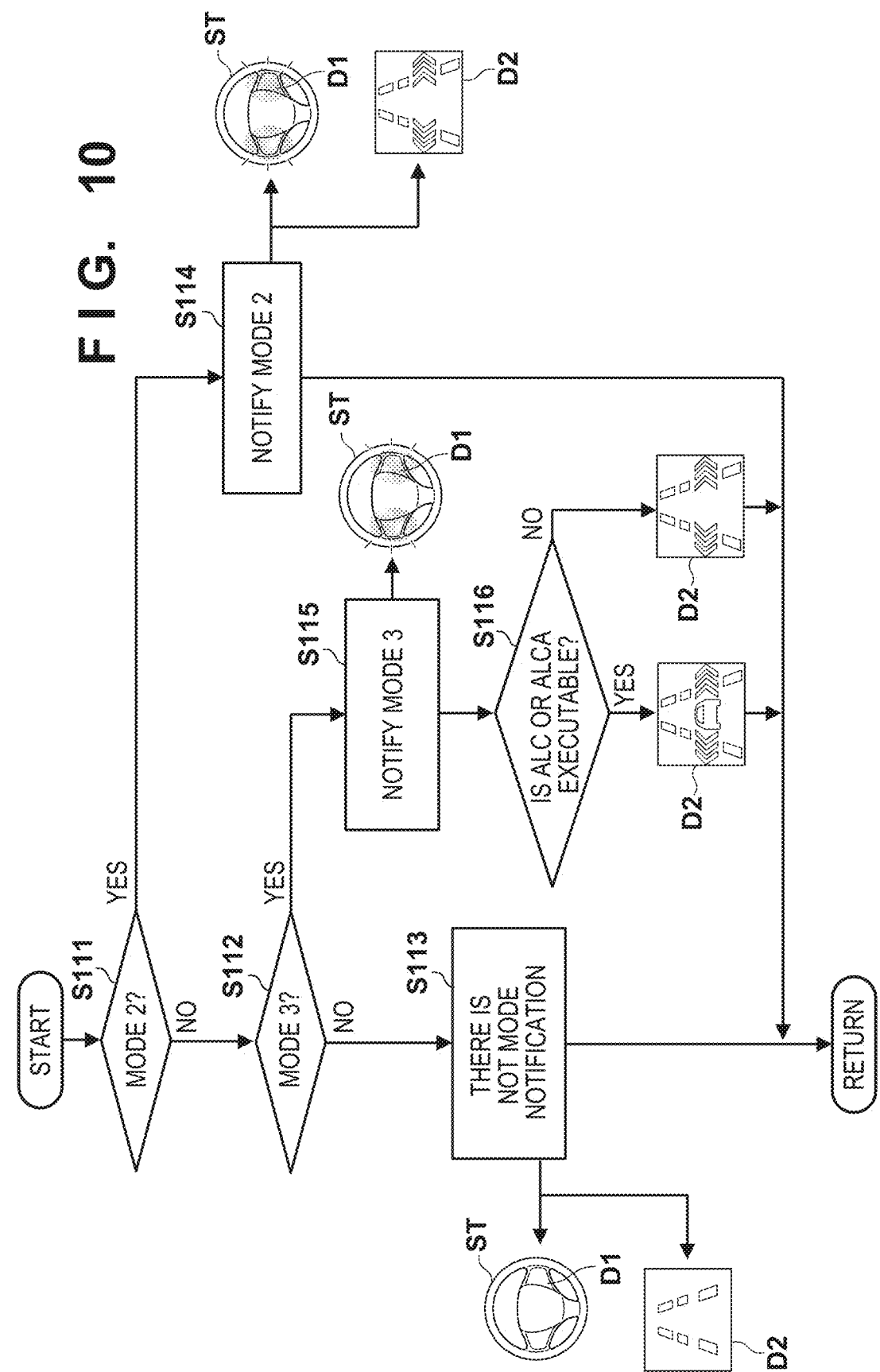
FIG. 10 is a flowchart of an example of a process performed by the control device illustrated in FIG. 1.

The control device CNT can provide further high reliability to the passenger by notifying the passenger of the switch between modes 1 to 3 and/or the type of drive assist executable. FIG. 10 is a flowchart of an example of a process performed by the ECU to provide information to the passenger.

In S111, the ECU determines whether the current drive assist mode is mode 2. When the current drive assist mode is mode 2, the ECU makes the process proceed to S114; when it is not mode 2, the ECU makes the process proceed to S112. In S114, the ECU issues a notification in which the vehicle V is in mode 2. In the example of FIG. 10, the light-emitting section D1 provided in the steering wheel ST emits light having a predetermined color (e.g., blue light). In addition, the display section D2 on the instrument panel displays an icon indicating that drive assist is being executed.

In S112, the ECU determines whether the current drive assist mode is mode 3. When the current drive assist mode is mode 3, the ECU makes the process proceed to S115; when it is not mode 3, the ECU makes the process proceed to S113. In S115, the ECU issues a notification in which the vehicle V is in mode 3. In the example of FIG. 10, the light-emitting section D1 provided in the steering wheel ST emits light having another predetermined color (e.g., green), which is different from the color of the light in mode 2. In S116, the ECU determines whether either ALC or ALCA is executable. When neither ALC nor ALCA is executable because LKAS has been canceled through the customization of the passenger, the display section D2 displays the same icon as in mode 2. When either ALC or ALCA is executable because LKAS has not been canceled, the display section D2 displays an icon (containing a vehicle image) different from that in mode 2.

In S113, the ECU does not issue a notification of the current mode because the current drive assist mode is mode 1. In this case, the light-emitting section D1 provided in steering wheel ST is turned off. In addition, the display section D2 in the instrument panel displays an icon (lane image only) different from any of those in mode 2 and mode 3.

To support ALCA, the ECU may constantly monitor traffic states on the right and left lanes of the vehicle V and notifies a lane to which the vehicle V can change a running lane from the current lane. The driver can refer to this notification and request the lane change by operating the blinker lever 6b, for example, as necessary. In response to this request, the ECU can cause the vehicle V to change the lanes. Optionally, the display section D2 may make the notification by displaying a predetermined icon so that the passenger can realize to which lane(s) (right or left lane or both lanes) the vehicle V can change a running lane from the current lane.

Summary of Embodiments

The foregoing embodiment discloses at least the following control device and control method.
1. A control device (CNT) controlling a vehicle (V) according to the embodiment, comprises:
   a control unit (1) configured to execute lane change assist control of the vehicle; and
   an acquisition unit (1, 7c) configured to acquire highly accurate map information that contains location information within a lane,
   wherein when the acquisition unit acquires the highly accurate map information that contains information regarding a road on which the vehicle is running, the control unit is configured to be capable of executing the lane change assist control (S101, S107), and
   when the acquisition unit does not acquire the highly accurate map information that contains the information regarding a road on which the vehicle is running, the control unit does not execute the lane change assist control (S101).

According to this embodiment, the control device can provide a passenger in a vehicle with highly reliable lane change assist by suppressing the passenger from feeling uncomfortable.

2. In the embodiment,
   the control unit is configured to be capable of executing acceleration/deceleration assist control (ACC) of the vehicle,
   the control unit is configured to be capable of executing lane keeping assist control (LKAS) of the vehicle, and
   the control unit does not execute the lane change assist control when the lane keeping assist control is not executed (S102).

According to this embodiment, the control device can provide the passenger with highly reliable lane change assist by not executing the lane change assist control when a location of the vehicle within a lane has not been identified with sufficiently high precision.

3. The control device according to the embodiment, further comprises
   a reception unit (6, S51, S52) configured to receive, from a passenger, a request to cancel execution of the lane keeping assist control.

According to this embodiment, the control device can provide drive assist in accordance with driver's preference.

4. The control device according to the embodiment, further comprises a determination unit (S39) configured to determine whether the highly accurate map information is latest information, and
   when the determination unit determines that the highly accurate map information is not latest information, the control unit does not execute the lane change assist control (S101).

According to this embodiment, the control device can provide the passenger with highly reliable lane change assist 5. The control device according to the embodiment, further comprises a notifying unit (D2, S116) configured to notify a passenger that the control unit is ready to execute the lane change assist control, and the notifying unit is configured to also notify the passenger that the control unit does not execute the lane change assist control (D2, S116).

According to this embodiment, the control device enables the driver to recognize that the lane change assist is available, whereas it also enables the driver to recognize that the lane change assist is unavailable.

6. The control device according to the embodiment, further comprises a reception unit (6, S32, S33) configured to receive a drive assist request from a passenger, and when the reception unit receives the drive assist request, the control unit is configured to be capable of executing the lane change assist control (S34, S40, S107).

According to this embodiment, the control device can provide the lane change assist to the driver in accordance with a driver's request.

7. The control device according to the embodiment, further comprises a determination unit (S93, S95) configured to determine whether to execute lane change, the lane change assist control includes system request control (S103, S107)) to be executed when the determination unit determines execution of the lane change, and, cases where the determination unit determines the execution of the lane change include: a case of route guidance to a destination; and a case of overtaking a preceding vehicle.

According to this embodiment, the control device can help the vehicle run smoothly.

8. In the embodiment, when the vehicle is running on a first road indicated by the highly accurate map information, the control unit is configured to be capable of executing the lane change assist control after the reception unit receives the drive assist request (S38, S40), when the vehicle then enters a second road that is not indicated by the highly accurate map information, the control unit does not execute the lane change assist control (S38, S34), and when the vehicle then enters a third road indicated by the highly accurate map information, the control unit is configured to be capable of executing the lane change assist control without a need to receive the drive assist request again (S31, S38, S40).

According to this embodiment, in relation to a drive assist request, the control device can suppress the passenger from finding it inconvenient.

9. The control device according to the embodiment, further comprises a determination unit (S36) configured to determine whether a passenger performs a drive operation, wherein when the determination unit determines that the passenger performs the drive operation, the vehicle is set to a manual mode (mode 1) in which none of the acceleration/deceleration assist control, the lane keeping assist control, and the lane change assist control is executed (S41).

According to this embodiment, the control device can control the vehicle in conformity with a driver's intention, thereby entrusting driving of the vehicle to the driver.

10. The control device according to the embodiment, further comprises a determination unit (S93, S95) configured to determine whether to execute lane change, the lane change assist control includes:

system request control (S103, S107) to be executed when the determination unit determines execution of the lane change; and passenger request control (S105, S107) to be executed based on a request of a passenger, and the system request control is executed only when accepted in advance by the passenger (S104).

According to this embodiment, the control device can suppress the vehicle from changing lanes against a driver's intention.

11. In the embodiment, when the system request control and the passenger request control conflict with each other, the passenger request control is prioritized (S108).

According to this embodiment, the control device can cause the vehicle to change lanes in conformity with a driver's intention, thereby providing the driver with improved reliable drive assist.

12. The control device according to the embodiment, further comprises a reception unit (6, S32, S33) configured to receive a drive assist request from a passenger, when the acquisition unit does not acquire the highly accurate map information that contains information regarding a road on which the vehicle is running and the reception unit receives the drive assist request, the control unit executes both an acceleration/deceleration assist control and a lane keeping assist control of the vehicle (mode 2), and when the acquisition unit then acquires the highly accurate map information that contains the information regarding a road on which the vehicle is running, the control unit is ready to also execute the lane change assist control (mode 3).

13. The control device according to the embodiment, further comprises a setting unit (S31-S41) configured to set one mode from among a plurality of modes of providing different drive assists, wherein the control unit controls the vehicle in accordance with the mode set by the setting unit, the plurality of modes include:

a first mode (mode 2) in which the lane change assist control is not executed; and a second mode (mode 3) in which the lane change assist control is executable, and when the acquisition unit does not acquire the highly accurate map information that contains the information regarding a road on which the vehicle is running, the setting unit does not set the second mode (S38).

According to this embodiment, the control device can provide a passenger in a vehicle with highly reliable lane change assist by suppressing the passenger from feeling uncomfortable. Moreover, the control device can control the drive assist in units of modes.

14. The control device according to the embodiment, further comprises a sensing unit (9b) configured to sense whether a driver grips a steering wheel (ST) of the vehicle, in the first mode (mode 2), both an acceleration/deceleration assist control and a lane keeping assist control of the vehicle are executable (S63), in the second mode, both the acceleration/deceleration assist control and the lane keeping assist control using the highly accurate map information are executable (S72), and in both the first mode and the second mode, it is monitored whether the driver grips the steering wheel, based on a sensing result of the sensing unit (S1-S3).

According to this embodiment, the control device can help to improve driver's safety consciousness.

15. A control method of controlling a vehicle (V) according to the embodiment, comprises:
a control step (S107) of executing lane change assist control of the vehicle; and
an acquisition step (S11-S15, S21-S25)) of acquiring highly accurate map information that contains location information within a lane,
when the highly accurate map information that contains information regarding a road on which the vehicle is running is acquired in the acquisition step, the lane change assist control is executable in the control step (S101, S107), and
when the highly accurate map information that contains the information regarding a road on which the vehicle is running is not acquired in the acquisition step, the lane change assist control is not executed in the control step (S101).

According to this embodiment, the control device can provide a passenger in a vehicle with highly reliable lane change assist by suppressing the passenger from feeling uncomfortable.

While an embodiment has been described, the invention is not limited to the foregoing embodiments, and various variations/changes are possible within the spirit of the invention.

What is claimed is:

1. A control device controlling a vehicle, comprising:
a control unit configured to execute controls including a lane change assist control of the vehicle;
an acquisition unit configured to acquire highly accurate map information that contains location information within a lane; and
a notifying unit configured to notify a passenger,
wherein the control unit is configured to:
    in a case where a regular assist mode is set, execute acceleration/deceleration assist control of the vehicle and lane keeping assist control of the vehicle; and
    in a case where an extended assist mode is set, execute the acceleration/deceleration assist control, the lane keeping assist control, and the lane change assist control,
when the acquisition unit acquires the highly accurate map information that contains information regarding a road on which the vehicle is running, the control unit is configured to be capable of executing the lane change assist control,
when the acquisition unit does not acquire the highly accurate map information that contains the information regarding a road on which the vehicle is running, the control unit does not execute the lane change assist control,
when the extended assist mode is set and the control unit is ready to execute the lane change assist control, the notifying unit is configured to notify the passenger that the control unit is ready to execute the lane change assist control, and
when the extended assist mode is set and the control unit does not execute the lane change assist control, the notifying unit is configured to notify the passenger that the control unit does not execute the lane change assist control.

2. The control device according to claim 1, wherein the control unit does not execute the lane change assist control when the lane keeping assist control is not executed.

3. The control device according to claim 2, further comprising a reception unit configured to receive, from a passenger, a request to cancel execution of the lane keeping assist control.

4. The control device according to claim 1, further comprising:
a receiving unit configured to receive update information of the highly accurate map information by communicating with a map-providing server; and
a determination unit configured to determine whether the highly accurate map information is latest information,
wherein when the determination unit determines that the highly accurate map information is not latest information, the control unit does not execute the lane change assist control.

5. The control device according to claim 1, further comprising a reception unit configured to receive a drive assist request from a passenger, wherein when the reception unit receives the drive assist request, the control unit is configured to be capable of executing the lane change assist control.

6. The control device according to claim 1, further comprising a determination unit configured to determine whether to execute lane change,
wherein the lane change assist control includes system request control to be executed when the determination unit determines execution of the lane change, and,
cases where the determination unit determines the execution of the lane change include: a case of route guidance to a destination; and a case of overtaking a preceding vehicle.

7. The control device according to claim 5, wherein when the vehicle is running on a first road indicated by the highly accurate map information, the control unit is configured to be capable of executing the lane change assist control after the reception unit receives the drive assist request,
when the vehicle then enters a second road that is not indicated by the highly accurate map information, the control unit does not execute the lane change assist control, and
when the vehicle then enters a third road indicated by the highly accurate map information, the control unit is configured to be capable of executing the lane change assist control without a need to receive the drive assist request again.

8. The control device according to claim 2, further comprising a determination unit configured to determine whether a passenger performs a drive operation,
wherein when the determination unit determines that the passenger performs the drive operation, the vehicle is set to a manual mode in which none of the acceleration/deceleration assist control, the lane keeping assist control, and the lane change assist control is executed.

9. The control device according to claim 1, further comprising a determination unit configured to determine whether to execute lane change, wherein the lane change assist control includes:
system request control to be executed when the determination unit determines execution of the lane change; and
passenger request control to be executed based on a request of a passenger, and
the system request control is executed only when accepted in advance by the passenger.

10. The control device according to claim 9, wherein when the system request control and the passenger request control conflict with each other, the passenger request control is prioritized.

11. The control device according to claim 1, wherein in a case where the extended assist mode is set:
when the acquisition unit does not acquire the highly accurate map information that contains information regarding a road on which the vehicle is running and the reception unit receives the drive assist request, the control unit executes both the acceleration/deceleration assist control and the lane keeping assist control of the vehicle; and
when the acquisition unit then acquires the highly accurate map information that contains the information regarding a road on which the vehicle is running, the control unit is ready to also execute the lane change assist control.

12. The control device according to claim 1, further comprising a setting unit configured to set one mode from among a plurality of modes of providing different drive assists,
wherein the control unit controls the vehicle in accordance with the mode set by the setting unit,
the plurality of modes include the regular assist mode and the extended assist mode, and
when the acquisition unit does not acquire the highly accurate map information that contains the information regarding a road on which the vehicle is running, the setting unit does not set the extended assist mode.

13. The control device according to claim 1, further comprising a sensing unit configured to sense whether a driver grips a steering wheel of the vehicle, wherein;
in both the regular assist mode and the extended assist mode, it is monitored whether the driver grips the steering wheel, based on a sensing result of the sensing unit.

14. The control device according to claim 1, wherein the notifying unit includes a display device configured to display a first icon when the regular assist mode is set, the display device is configured to display a second icon when the extended assist mode is set and the control unit does not execute the lane change assist control, and the second icon is the same icon as the first icon.

15. A control method of controlling a vehicle, the control method comprising:
a control step of executing controls including lane change assist control of the vehicle;
an acquisition step of acquiring highly accurate map information that contains location information within a lane; and
a notifying step of notifying a passenger,
wherein
in a case where a regular assist mode is set, acceleration/deceleration assist control of the vehicle and lane keeping assist control of the vehicle are executed in the control step,
in a case where an extended assist mode is set, the acceleration/deceleration assist control, the lane keeping assist control and the lane change assist control are executed in the control step,
when the highly accurate map information that contains information regarding a road on which the vehicle is running is acquired in the acquisition step, the lane change assist control is executable in the control step,
when the highly accurate map information that contains the information regarding a road on which the vehicle is running is not acquired in the acquisition step, the lane change assist control is not executed in the control step,
when the extended assist mode is set and the lane change assist control is ready to be executed, the passenger is notified in the notifying step that the lane change assist control is ready to be executed, and
when the extended assist mode is set and the lane change assist control is not to be executed, the passenger is notified in the notifying step that the lane change assist control is not executed.

* * * * *